US012704400B2

(12) United States Patent
Saksela et al.

(10) Patent No.: US 12,704,400 B2
(45) Date of Patent: Aug. 11, 2026

(54) CALIBRATOR FOR ACOUSTIC CAMERAS AND OTHER RELATED APPLICATIONS

(71) Applicant: Noiseless Acoustics Oy, Helsinki (FI)

(72) Inventors: Kai Saksela, Kauniainen (FI); Jonas Nyberg, Helsinki (FI); Manu Niukkanen, Kauniainen (FI); Oliver Merilaid, Helsinki (FI); Robert Albrecht, Porvoo (FI)

(73) Assignee: NOISELESS ACOUSTICS OY, Helsinki (FI)

( * ) Notice: Subject to any disclaimer, the term of this patent is extended or adjusted under 35 U.S.C. 154(b) by 71 days.

(21) Appl. No.: 17/797,555

(22) PCT Filed: Jan. 29, 2021

(86) PCT No.: PCT/FI2021/050060

§ 371 (c)(1),
(2) Date: Aug. 4, 2022

(87) PCT Pub. No.: WO2021/160932

PCT Pub. Date: Aug. 19, 2021

(65) Prior Publication Data

US 2023/0052098 A1 Feb. 16, 2023

(30) Foreign Application Priority Data

Feb. 13, 2020 (FI) ..................................... 20205148

(51) Int. Cl.
*G01H 3/00* (2006.01)
*G01H 3/12* (2006.01)
(Continued)

(52) U.S. Cl.
CPC ............. *G01H 3/005* (2013.01); *G01H 3/125* (2013.01); *H04R 1/403* (2013.01); *H04R 29/008* (2013.01)

(58) Field of Classification Search
CPC ........ G01H 3/005; G01H 3/125; H04R 1/403; H04R 29/008
See application file for complete search history.

(56) References Cited

U.S. PATENT DOCUMENTS 8,229,134 B2 7/2012 Duraiswami et al.
2008/0034869 A1 2/2008 Heinz et al.
(Continued)

FOREIGN PATENT DOCUMENTS

CN 102056073 A 5/2011
CN 202222048 U * 5/2012
(Continued)

OTHER PUBLICATIONS

Briel et al:"User Manual Hand-held Analyzer Types 2250 and 2270 Tone Assessment Option BZ-7231 and Enhanced Vibration and Low Frequency Option BZ-7234 BE 1713-32 English" (Feb. 1, 2016), pp. 1-368, XP055801506 (Year: 2016).*
(Continued)

*Primary Examiner* — Abdallah Abulaban
(74) *Attorney, Agent, or Firm* — Merchant & Gould P.C.

(57) ABSTRACT

An external calibrating device (10) for a measurement device, which may be an acoustic camera. The calibrating device (10) includes a sound source (11) and a light source (12), which are preferably pointed to the same direction. This direction can be a horizontal direction, where the sources (11, 12) locate on the same vertical side surface of the calibrating device (10). An IR LED can be used as the light source (12). The measurement device may instruct a user how to place and align the measurement device during the calibration process. Guidance is given by instructions, volume range information, and focusing lines on the screen. When the instructions are fulfilled, the user may acknowledge the finished calibration process.

5 Claims, 2 Drawing Sheets

(51) Int. Cl.
*H04R 1/40* (2006.01)
*H04R 29/00* (2006.01)

(56) References Cited

U.S. PATENT DOCUMENTS

| | | | | |
|---|---|---|---|---|
| 2008/0144876 | A1 | 6/2008 | Reining et al. | |
| 2009/0028347 | A1* | 1/2009 | Duraiswami | H04R 1/406 381/26 |
| 2012/0288114 | A1* | 11/2012 | Duraiswami | H04R 1/406 381/92 |
| 2015/0167956 | A1 | 6/2015 | Vaidya | |
| 2015/0365773 | A1 | 12/2015 | Ross et al. | |
| 2019/0069085 | A1* | 2/2019 | Tanaka | H04R 1/40 |
| 2019/0261108 | A1 | 8/2019 | Saksela et al. | |

FOREIGN PATENT DOCUMENTS

| | | | | |
|---|---|---|---|---|
| EP | 1599708 | B1 | 5/2007 | |
| WO | 2009/130243 | A2 | 10/2009 | |
| WO | 2018/055232 | A1 | 3/2018 | |
| WO | WO-2019225681 | A1 * | 11/2019 | G06T 7/246 |
| WO | 2020/023629 | A1 | 1/2020 | |

OTHER PUBLICATIONS

Briel et al:"USERMANUALHand-heldAnalyzerTypes2250and2270ToneAssessmentOptionBZ-7231andEnhancedVibrationandLowFrequencyOptionBZ-7234BE1713-32English" (Feb. 1, 2016), pp. 1-368 (Year: 2016).*

PCT International Search Report and Written Opinion for PCT Application No. PCT/FI2021/050060 mailed May 18, 2021 (20 pages).

Finnish Search Report for FI U.S. Appl. No. 20/205,148 mailed Sep. 11, 2020 (3 pages).

Bruel et al., "User Manual Hand-held Analyzer Types 2250 and 2270 Tone Assessment Option BZ-7231 and Enhanced Vibration and Low Frequency Option BZ-7234 BE 1713-32 English," 2016, pp. 1-368, XP055801506, Retrieved from the Internet: URL:https://www.bksv.com/-/media/literature/Various/bel713.ashx, retrieved on May 4, 2021.

Ruff Mike: "Audio Light Series from Sykes-Pickavant combines up to three devices in one," 2019, pp. 1-2, XP055801024, retrieved from the Internet: https://garagewire.co.uk/news/company/sykes-pickavant/audio-light-series-from-sykes-pickavant-combines-up-to-three-devices-in-one/, retrieved on May 3, 2021.

Finnish Search Report for FI Application No. 202115099 mailed Nov. 3, 2021 (1 page).

* cited by examiner

CALIBRATOR FOR ACOUSTIC CAMERAS AND OTHER RELATED APPLICATIONS

CROSS-REFERENCE TO RELATED APPLICATIONS

This application is a National Stage Application of PCT/FI2021/050060, filed 29 Jan. 2021, which claims benefit of Ser. No. 20/205,148, filed 13 Feb. 2020 in Finland, and which applications are incorporated herein by reference. To the extent appropriate, a claim of priority is made to each of the above disclosed applications.

FIELD OF THE INVENTION

The present invention relates to calibrating various types of devices which are able to visualize certain environmental conditions or emissions, for instance. In more detail, the present invention may relate to calibrating an acoustic camera which visualizes sounds.

BACKGROUND OF THE INVENTION

Acoustic cameras are devices visualizing sounds and noises present in the ambient environment of the acoustic camera. The acoustic camera usually comprises a screen where the sounds and noises can be presented on top of the taken visual image via a regular camera. The magnitudes of the sounds can be shown through different colours, pointing out the highest magnitudes of sound sources very practically on the screen. The user may point and align the acoustic camera freely as he/she moves around the inspected premises. The application areas are various, from electrical failures such as short circuits or general noise mitigation e.g. in office or factory premises, or in inspecting the soundproofness of certain physical structures.

Publication WO 2018/055232 ("Saksela") discloses one example of such an acoustic camera. This device combines the image taken by an optical camera and the acoustic image obtained by an assembly of microphones. Provided with a screen, handle, a certain form for the device housing and the processor for signal analysis, the acoustic camera is also provided with classification functionality for classifying the received, distinctive sounds and informing them to the user.

Publication US 2008/034869 ("Heinz") discloses a device for imaged representation of acoustic objects. Heinz presents a round-shaped microphone assembly in FIG. 1, and the system also comprises a data recorder (dRec) and a PC. The microphone assembly is located on a tripod. In the center of the microphone assembly, there is a video camera (VK). Heinz comprises a calibration tester (KT) which contains a speaker (LT). The microphone array (MA), the video camera, the PC and the calibration tester all connected respectively to the data recorder. An older image can be calculated via the saved parameters in the saved data. According to par. [0083], a precise superposition and orientation between video image and acoustic image can be checked before a measurement. To accomplish this, a calibration test of the system is carried out by means of a so-called clicker. This produces a test sound by means of a high-pitch speaker (LT). The system works correctly if the acoustic map and the video image coincide at the speaker.

The problem in prior art is that there has not been an effective, easy, practical and manually tunable arrangement for calibrating properly a measurement device after it leaves the factory premises.

SUMMARY OF THE INVENTION

In its first aspect, the present invention introduces a calibrating device i.e. a loud-speaker; comprising a directional sound source and a light source. In other words, the present invention discloses a calibrating device configured to calibrate a measurement device. It is characterized in that the calibrating device comprises:

a loudspeaker comprising a sound source, where the output sound is directionally alignable, at least one light source, where the light is directionally alignable, and wherein the sound source and the light source locate on a same side of the device, the aligned output sound and the aligned light propagating substantially at the same direction during calibration.

In its second aspect, the present invention introduces a visualizing device; comprising a screen, showing visual graphics (i.e. guidance) for aligning and focusing the calibrating device. In an embodiment, the screen is integrally part of an acoustic camera. In other words, the present invention discloses a visualizing device, which is characterized in that it comprises a screen, which during calibration process, is configured to illustrate guidance to a user, in order to place and align the measurement device in an appropriate position and alignment angle in view of a calibrating device.

In its third aspect, the present invention introduces a system which comprises the calibrating device according to the first aspect and the visualizing device according to the second aspect, in order to calibrate the measurement device, which can be an acoustic camera in a specific embodiment. Also in an embodiment, the visualizing device comprises actually the screen of the acoustic camera to be calibrated, and the processor of the acoustic camera. In other words for the third aspect, the system for calibrating a measurement device is characterized in that the system comprises a calibrating device according to any of the embodiments concerning the first aspect and a visualizing device according to any of the embodiments concerning the second aspect, wherein the system is configured to:

present instructions to a user for setting the location and alignment angle of the visualizing device in a manual manner, and to present a dedicated area on the screen of the visualizing device for the light source, and to present a volume bar in view of the received sound levels on the screen of the visualizing device, and when the light source seems to be substantially in the desired dedicated area and the received sound level stays in a desired sound level range, the system is configured to be calibrated properly.

In its fourth aspect, the present invention also comprises a method, whose steps for calibrating the measurement device comprises:

outputting sound and light from a calibrating device;

giving focusing instructions of the measurement device to a user via a visualizing device;

illustrating received sound and received light on a screen of the visualizing device; and obtaining calibration as successful when the focusing instructions of the measurement device are fulfilled via a feedback on the visualizing device, through a manual placement of the measurement device and given acknowledgement by the user.

In an embodiment of the method, the visualizing device is a screen of an acoustic camera, and the acoustic camera is the measurement device as well, which is con-trolled by a processor, and the acoustic camera comprises a plurality of microphones and a camera operating in optically visible light and infrared light ranges.

In its fifth aspect, a respective computer program and computer readable medium are introduced as well, realizing the presented method steps.

DETAILED DESCRIPTION OF THE INVENTION

Figure 1:
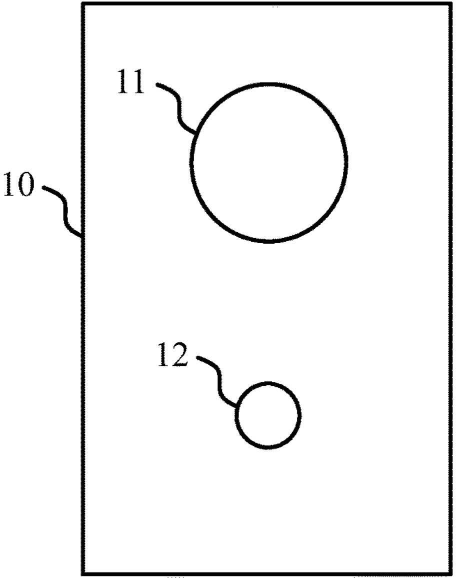
FIG. 1 illustrates a simplified image of an exemplary embodiment showing a loud-speaker with a sound source and an infrared light source.

The present invention introduces a method and an arrangement for performing a calibration for a measurement device. By a measuring device, it is meant a various group of devices which have at least one sensor or receiving means. To be more precise, in one embodiment the measuring device can be a sensing device for acoustic environment, i.e. formed by at least one microphone or microphone assembly in a certain physical arrangement, or more precisely, an acoustic camera which is a handheld device for measuring sounds in a certain pointable direction. The measurement device can however be any device capable to receive e.g. an RF signal, energy in certain wavelengths, and/or acoustic signals in frequency ranges audible by humans or even in ranges not audible by humans.

The present invention is implemented in practice so that it needs two devices; the actual measurement device (such as an acoustic camera) and a calibrating unit (i.e. a calibrator), where the latter one is discussed in the following. We also refer to FIG. 1 where an example of a calibrating unit is depicted as a simple illustration.

A calibrator unit 10 comprises a sound source 11 and a light source 12. In an embodiment of the invention, the light source 12 is a source emitting directional light in a predetermined wavelength or in a predetermined wavelength range. In yet another embodiment, the light source 12 is determined to operate within an infrared wavelength range. In a yet further embodiment, the light source 12 to be applied is an infrared LED.

The sound source 11 within the calibrator unit 10 can also be called as a speaker or loudspeaker where the light source 12 is additionally attached, preferable on its side surface. In a practical use situation, both the sound source 11 and the light source 12 are placed on a vertical side of the calibrator unit 10 so that their output sound and emitted light, respectively, are directed to a substantially horizontal direction. Of course, the beam width is more than 0 degrees, and such examples of sound emission and light emission beams are exemplified in FIG. 2 (beams 13 and 14). With the horizontal output direction of both the sound from the loudspeaker 11 and the light from the light source 12, it will be easier to use manually by a person, who performs the calibration by a handheld procedure.

In an embodiment of the invention, the output sound from loudspeaker 11 has directional characteristics. In another embodiment, the output signal from light source 12 has directional characteristics. In yet another embodiment, both the loudspeaker 11 and the light source 12 are directional output elements, and additionally, both these outputs are focused in the same area or location. The focusing process can be implemented either by physical placement (i.e. alignment) of the elements 11 and/or 12, or by some selective, programmable means (e.g. in case the loudspeaker 11 actually consists a plurality of sound output elements). The focusing process means that there will be at least one location, where the measurement device (e.g. an acoustic camera to be calibrated) can be placed in ease and without too much manual effort.

Figure 2:
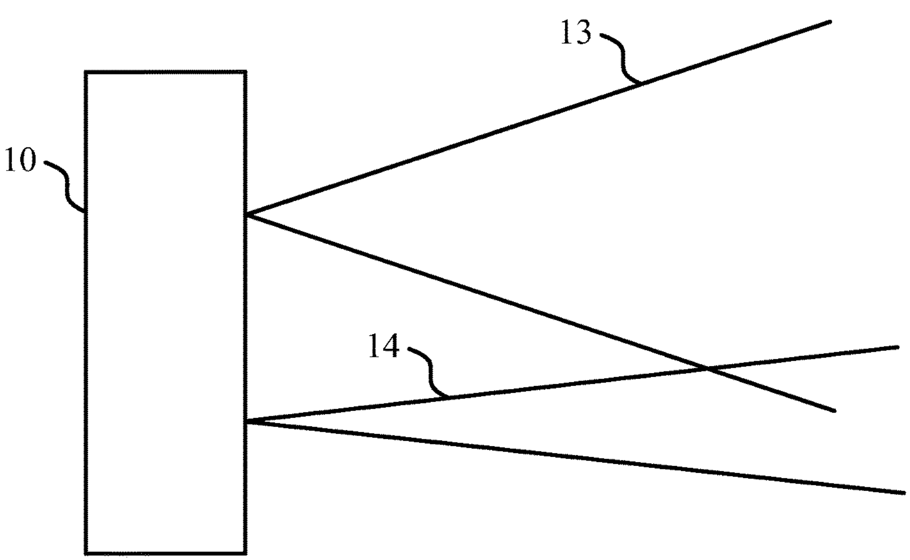
FIG. 2 illustrates an embodiment showing directionality of the transmitted signals sent by the loudspeaker, shown from an orthogonal direction compared to FIG. 1.

FIG. 2 illustrates the calibrator unit 10 from 90 degrees different viewing angle compared to FIG. 1 (i.e. from the side, as FIG. 1 is shown from the front). The directional acoustic signal output, i.e. a predetermined sound, propagates from the loudspeaker 10 as defined within a sound beam 13. Similarly, the directional light signal output propagates from the light source 12 as defined within a light beam 14. While the image shows the light beam 14 narrower compared to the sound beam 13, this is merely a single example of all possible scenarios. The main thing in the assembly is that the sources 11 and 12 locate on the same planar side or surface of the unit 10, so that the propagating signals from the two sources proceed to a substantially same direction. In a practical use situation, this direction is, at least to a large extent, horizontal in an embodiment. Still, in one possible embodiment, the loudspeaker 10 could lay on the ground with elements 11 and 12 pointing upwards, and the user could point the acoustic camera or other measurement device directly downwards from a standing position.

Figure 3:
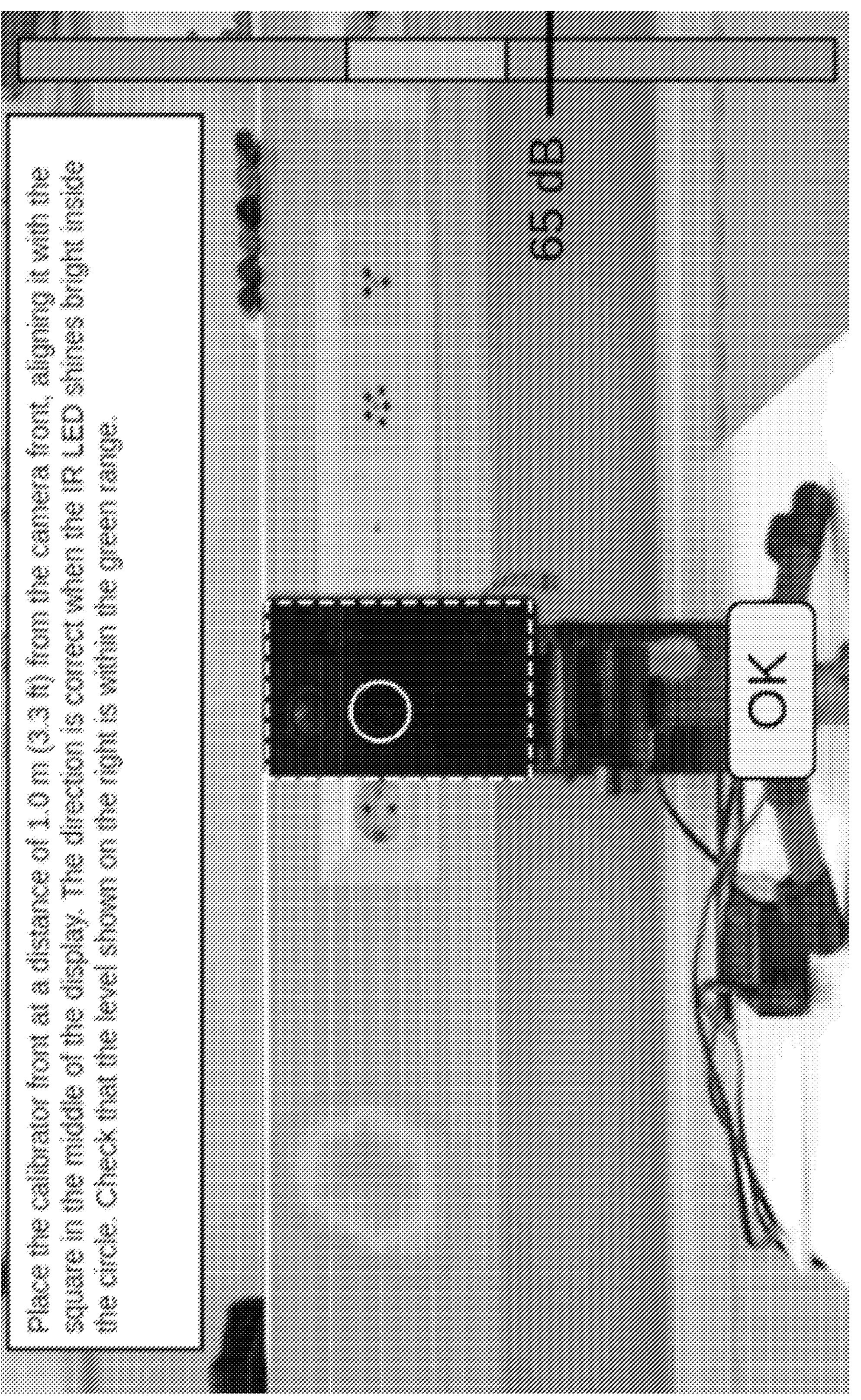
FIG. 3 illustrates a practical example, how the screen of the device to be calibrated looks like during the calibration process.

Now we go into the use and interfaces at the measuring device, which needs some assistive features in order to enable the calibration process. FIG. 3 is referred in this regard. The measuring device according to an embodiment of the invention can be, as already mentioned, a handheld acoustic camera which comprises a handle, a screen, an optical camera operating in visible light and/or IR light ranges, and a group of microphones within a protective housing; and a processor or controller as well for processing received sound signals, and for presenting them in a practical form to the user via the screen on the housing of the acoustic camera. The assistive features of the acoustic camera are created by its screen, which is normally used for visualizing noise and sound sources across the optical image area. The screen can be a touch screen. In an embodiment, the assistive features on the screen of the device may comprise a volume reference bar at the side of the image (here in the right side of the screen as a vertical bar; with a desired volume range just upwards from the shown 65 dB value). Additionally, the assistive features can comprise a piece of information to the user, in a form of an information screen; here located in the top side of the screen. Here the instructions have been formulated in a following, exemplary piece of advice to the user:

> "Place the calibrator front at a distance of 1.0 m (3.3 ft) from the camera front, aligning it with the square in the middle of the display. The direction is correct when the IR LED shines bright inside the circle. Check that the level shown on the right is within the green range."

We note that while this exemplary piece of instructions mentions "an IR LED", this can be replaced by e.g. "the light source" or "the LED", in a more general fashion. By the "green range", we mean the middle section of the volume range around the central part of the volume bar. Then, the assistive features, or guidance represented in guidance areas, comprise a square or a rectangular area (shown by lines i.e. a box) shown in or near the center part of the screen. This can be seen in the example with dashed lines. Furthermore, in an embodiment, the dashed lined area comprises a circle (i.e. a circular area) which is designed to focus the light source 12 (such as an IR LED, for instance) in the image area. Here the circle is shown a bit up from the (imaginary) horizontal center line of the box, so this is not perfectly in line with the placements of FIG. 1. Still, the rectangular area meant for the placement of the calibrator unit 10 and the circular marking meant for the placement of the light source 12 need to be in line with the calibrator unit 10 actually used. Though a circle is mentioned above and shown in the Figures, this assistive shape or marking can also be something else than a circle, e.g. an oval shape or a rectangular area meant for the placement of the light source 12. This screen area meant for the light source 12 is also called a dedicated area on the screen for the light source 12, covering various possible shapes. This applies to all aspects of the invention, and not just the system.

There can additionally be some tripod or other kind of physical platform for the calibrator unit 10 (as shown in the optical image of FIG. 3) so that the calibrator unit is always with the “correct surface downwards”. This ensures that the light source 12 locates similarly with respect to the calibrator unit 10 housing as the dashed and intact lines on the screen suggest.

Finally, the assistive features may comprise an “OK” button (i.e. an acknowledgement box or button) on the touch screen; shown in FIG. 3 in the bottom of the screen area but it can of course locate somewhere else; even as a manual button elsewhere on the housing of the device. The user can press this button, when the conditions shown in the guidance are fulfilled, in other words, the physical parts are within the rectangle and the circle, and additional the received sound level is in the green range (and not in the red range). When the OK button is hit, the calibration process is manually concluded to be successful. The OK button can thus also be called as an acknowledgement box on the touch screen, with which the user can acknowledge the proper calibration as concluded based on the feedback shown on the screen (on the visualizing device). The feedback comprises the optical image of the calibrating device within the rectangular guidance area, the light (visible or IR) shown in the circular (or other shaped) area on the screen, and the received sound volume staying within the desired range as shown in the volume bar on the screen. After the acknowledgement by the user i.e. the successful conclusion of the calibration, the user may actually start using the acoustic camera normally, or the other measurement device in case that was calibrated. Now the user may remove the calibrator unit 10 from the premises (or at least turn it off), and start measuring the environment in the way which is desired for various different applications.

An advantage of the invention is that it gives an easy way to calibrate the measurement device, even after the manufacture of the device in a factory. Similarly, the calibration process can be repeated anytime, when the user wants to do it, or if the measurement results somehow indicate poor (i.e. false) acoustic results. The calibration process can be programmably activated on the screen of the device. Also, the calibration unit 10 is an additional accessory, which can be sold separately to the users. The calibration unit 10 is also easily mountable and/or installable into use, and it is also easily removable from the measured premises, after the calibration has been successfully done and completed.

As mentioned before, the processor handles the signal processing and analysis in the measuring device, which in an embodiment comprises simultaneously the visualizing device (i.e. screen) within the housing of the acoustic camera. In other words, in this embodiment, the measured signal is sound and the device which is calibrated is the acoustic camera, which has an own processor. In turn, the calibrating device 10 may have an own processor or controller for controlling the calibrating sound from the loudspeaker 11 and the on/off functionality of the light source 12. These separately form together an embodiment of the system meant for calibrating the measuring device. In an embodiment, there can be a central processor e.g. in the housing of the acoustic camera only, and the control signal to the calibrating device can be implemented with a wireless connection from the acoustic camera, e.g. via Bluetooth. In that situation, no separate processor is required in the calibrating device as such but of course proper transmission/reception means are then needed in the devices. No matter whether the system comprises one or two active processors for the calibration to be performed, the calibrating functionality can be implemented with at least one computer program, which can be stored in a computer readable medium. The computer program is implemented to be executable by the at least one processor, and thus, to realize the method steps concerning the calibration of the measuring device programmably. Storing of the computer program into appropriate medium (like e.g. to a CD-ROM, hard disk, memory stick, or any memory unit in the device) can then be non-transitory.

The present invention is not merely restricted to embodiments discussed above, but the present invention may vary within the scope of the claims.

The invention claimed is:

1. A system for calibrating sound reception of an acoustic camera, wherein the system comprises an acoustic camera and a calibrating device, the calibration device comprising:

a loudspeaker comprising a sound source, wherein output sound is directionally alignable;

at least one light source, wherein light is directionally alignable, and wherein the sound source and the at least one light source is located on a same side of the calibration device, aligned output sound and aligned light propagating substantially at a same direction during calibration;

the acoustic camera comprising a plurality of microphones and a screen, wherein the system is configured to:

receive acoustic signals using said plurality of microphones, process said received acoustic signals and present a visualization of sources of said sound signals on said screen, present instructions to a user on the screen of the acoustic camera for manually setting a location and alignment angle of the acoustic camera, present a dedicated area on the screen of the acoustic camera for the light source, present a volume range in view of received sound levels on the screen of the acoustic camera, and when the light source is substantially in the dedicated area and the received sound level stays in a desired sound level range, the acoustic camera is configured to be calibrated.

2. The system according to claim 1, wherein the system is configured to inform the user via the screen that calibration has been concluded successfully after a given acknowledgement.

3. The system according to claim 1, wherein the acoustic camera comprises a processor, and a handle or handling means for manual usability or a fixed platform for fixed placement in a desired location.

4. The system according to claim 2, wherein the acoustic camera comprises a processor, and a handle or handling means for manual usability or a fixed platform for fixed placement in a desired location.

5. A system for calibrating sound reception of an acoustic camera, wherein the system comprises an acoustic camera and a calibrating device, the calibration device comprising:

a loudspeaker comprising a sound source, wherein output sound is directionally alignable;

at least one light source, wherein light is directionally alignable, and wherein the sound source and the at least one light source is located on a same side of the calibration device, aligned output sound and aligned light propagating substantially at a same direction during calibration;

the acoustic camera comprising:

a screen, a processor, a handle or a fixed platform for fixed placement in a desired location, and a plurality of microphones;

wherein the system is configured to:

receive acoustic signals using said plurality of microphones, process said received acoustic signals and present a visualization of sources of said sound signals on said screen, present instructions to a user on the screen of the acoustic camera for manually setting a location and alignment angle of the acoustic camera, present a dedicated area on the screen of the acoustic camera for the light source, present a volume range in view of received sound levels on the screen of the acoustic camera, and when the light source is substantially in the dedicated area and the received sound level stays in a desired sound level range, the acoustic camera is configured to be calibrated.

* * * * *